(12) United States Patent
Balgañón Canela et al.

(10) Patent No.: US 12,493,768 B2
(45) Date of Patent: Dec. 9, 2025

(54) LEGAL COMPLIANCE VERIFICATION SYSTEM FOR CONSUMER PRODUCTS

(71) Applicant: PACKAGING INNOVATION, S. DE R.L., Panamá (PA)

(72) Inventors: Pedro Balgañón Canela, Barcelona (ES); Frank Herrera, Panama (PA)

(73) Assignee: PACKAGING INNOVATION, S. DE R.L., Panamá (PA)

( * ) Notice: Subject to any disclaimer, the term of this patent is extended or adjusted under 35 U.S.C. 154(b) by 0 days.

(21) Appl. No.: 18/627,254

(22) Filed: Apr. 4, 2024

(65) Prior Publication Data

US 2024/0249102 A1 Jul. 25, 2024

Related U.S. Application Data

(63) Continuation-in-part of application No. 17/857,683, filed on Jul. 5, 2022, now Pat. No. 12,361,251, which is a continuation-in-part of application No. 17/350,606, filed on Jun. 17, 2021, now Pat. No. 12,321,799, which is a continuation-in-part of application No. 17/182,308, filed on Feb. 23, 2021, now Pat. No. 11,694,051, which is a continuation of application No. 17/088,687, filed on Nov. 4, 2020, now Pat. No. 10,929,738.

(60) Provisional application No. 63/018,577, filed on May 1, 2020.

(51) Int. Cl.
*G06K 19/07* (2006.01)
*A24F 15/08* (2006.01)
*B65D 85/12* (2006.01)
*G06Q 30/0226* (2023.01)
*H04W 4/38* (2018.01)
*H04W 4/80* (2018.01)
*H04W 12/50* (2021.01)

(52) U.S. Cl.
CPC .......... *G06K 19/0723* (2013.01); *A24F 15/08* (2013.01); *B65D 85/12* (2013.01); *G06Q 30/0226* (2013.01); *H04W 4/38* (2018.02); *H04W 4/80* (2018.02); *H04W 12/50* (2021.01)

(58) Field of Classification Search
CPC ...... G06K 19/0723; H04W 4/38; H04W 4/80; H04W 12/50
USPC .......................................................... 235/492
See application file for complete search history.

(56) References Cited

U.S. PATENT DOCUMENTS

| | | | | |
|---|---|---|---|---|
| 2006/0224449 | A1* | 10/2006 | Byerley | G06Q 30/0226 705/14.27 |
| 2017/0193429 | A1* | 7/2017 | Olson | G06Q 10/087 |
| 2023/0322487 | A1* | 10/2023 | Patel | G06K 7/1413 700/206 |

(Continued)

*Primary Examiner* — Allyson N Trail
(74) *Attorney, Agent, or Firm* — Mark Terry

(57) ABSTRACT

A method for confirming legal compliance of a consumer product includes coupling a radio frequency tag to the consumer product, wherein after scanning the tag, the server transmits a request for descriptive information about the consumer product to an importer, a governmental entity, or an application user, transmits a request for verification of legal compliance of the consumer product to a governmental entity and transmits a request for a consumer product import tax calculation, other tax or governmental fee, and transmits the verification of legal compliance of the consumer product to a second importer, governmental entity, or application user.

13 Claims, 6 Drawing Sheets

(56) References Cited

U.S. PATENT DOCUMENTS

2024/0095718 A1* 3/2024 McDaniel .............. G07G 1/009
2024/0202725 A1* 6/2024 Anapliotis ......... G06Q 30/0607

* cited by examiner

LEGAL COMPLIANCE VERIFICATION SYSTEM FOR CONSUMER PRODUCTS

CROSS-REFERENCE TO RELATED APPLICATIONS

This patent application is a continuation in part of, and claims priority to, patent application Ser. No. 17/857,683 filed Jul. 5, 2022, which is a continuation in part of, and claims priority to, patent application Ser. No. 17/350,606 filed Jun. 17, 2021, which is a continuation in part of, and claims priority to, patent application Ser. No. 17/182,308 filed Feb. 23, 2021, which is a continuation of, and claims priority to, patent application Ser. No. 17/088,687 filed Nov. 4, 2020, which claims priority to provisional patent application 63/018,577 filed May 1, 2020. The subject matter of patent application Ser. No. 17/857,683, 17/350,606, 17/182, 308, 17/088,687 and 63/018,577 are hereby incorporated by reference in their entirety.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The claimed embodiments relate to the field of consumer safety and legal compliance and more specifically to the field of verifying a consumer product has effectuated legal compliance.

BACKGROUND

In the global commerce, the importance of ensuring consumer product compliance with local, national, and international legal standards cannot be overstated. As markets become increasingly interconnected, the task of tracking and verifying the legal compliance of a vast array of products has grown in complexity and urgency. Traditional methods of compliance verification often involve manual inspections and audits, which are not only time-consuming but also prone to errors and inconsistencies. These methods can lead to significant delays in product distribution, increased costs for manufacturers and distributors, and, most critically, the risk of non-compliant products reaching consumers, posing potential health and safety hazards.

Moreover, the reliance on physical documentation and disparate record-keeping systems has introduced additional challenges in ensuring the traceability and authenticity of products. In the face of evolving regulations and standards, businesses find it increasingly difficult to maintain up-to-date records of compliance across their product lines. This situation is further complicated by the need for coordination among multiple stakeholders, including manufacturers, importers, retailers, and regulatory bodies, each of whom may have different requirements and systems for tracking compliance.

The advent of digital technologies has offered some solutions to these challenges, notably through the use of electronic databases and RFID (Radio Frequency Identification) technology for tracking goods. However, these technologies often operate in silos, lacking a unified platform that can integrate diverse data sources and provide real-time, reliable compliance verification. Additionally, the potential of these technologies to streamline compliance verification processes and reduce associated costs has yet to be fully realized, with many businesses continuing to rely on outdated, labor-intensive methods.

The current state of the art in legal compliance verification for consumer products is marked by inefficiencies, high operational costs, and the ever-present risk of non-compliance. There is a clear need for a more integrated, technology-driven approach that can address these challenges, enhance the accuracy and efficiency of compliance verification processes, and ultimately ensure the safety and legality of products in the global marketplace.

SUMMARY

A method and system for verifying legal compliance of a consumer product is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claim subject matter's scope.

In one embodiment, the method includes coupling a radio frequency (RF) tag to the consumer product wherein said RF tag is programmed to provide a unique product identifier to a mobile computing device when said RF tag is scanned, storing in a database, communicatively coupled to a communications network, a record for each of a plurality of consumer products, wherein each record includes at least a unique product identifier, executing an application on a computing device communicatively coupled to the communications network, wherein said application is configured for reading the unique product identifier from the RF tag, and transmitting the unique product identifier to a server via the communications network, wherein the server is configured for receiving the unique product identifier, via the communications network, from the application, accessing a record in the database that corresponds to the unique product identifier, transmitting, via the communications network, a request for descriptive information about the consumer product to an importer, a governmental entity, or an application user, and receiving said descriptive information, via the communications network, transmitting a request for verification of legal compliance of the consumer product, via the communications network, to a governmental entity and receiving said verification, via the communications network, transmitting, via the communications network, a request for a consumer product import tax calculation, other tax or governmental fee, and receiving said consumer product import tax calculation, via the communications network, transmitting the verification of legal compliance of the consumer product, via the communications network, to a second importer, governmental entity, or application user.

BRIEF DESCRIPTION OF THE DRAWINGS

The accompanying drawings, which are incorporated in and constitute a part of this disclosure, illustrate various example embodiments. In the drawings.

DETAILED DESCRIPTION

Figure 1:
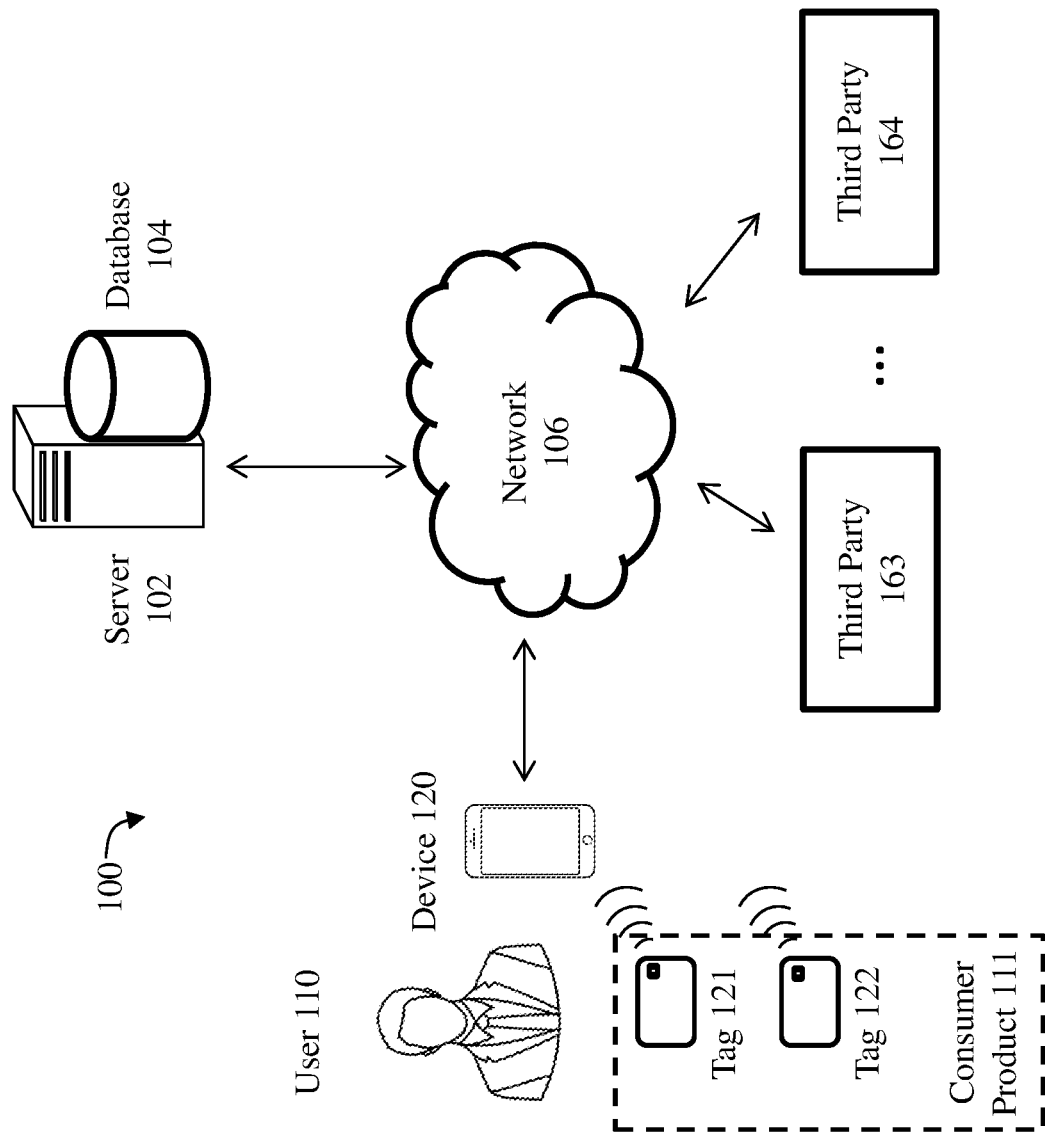
FIG. 1 is a block diagram of an operating environment that supports a process for legal compliance verification of consumer products, according to an example embodiment.

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a simple, cost-effective, and user-friendly method for verifying legal compliance of consumer products. The claimed subject matter reduces or eliminates the risk of purchasing or selling products that aren't legally compliant since it quickly and conveniently provides a user with information regarding the legal compliance of the product at question, and other relevant information. Also, the claimed subject matter reduces the amount of time and money a governmental entity, consumer or business may spend inspecting products for verifying legal compliance of a product by eliminating the need for manual inspection and verification. In addition, the claimed subject matter helps the consumer access information about their product including legal compliance, and other content relevant to the product and consumer. Therefore, the claimed subject matter reduces or eliminates the burden placed on governments, consumers, vendors, and manufacturers looking to verify or convey the legal compliance status of a consumer product.

FIG. 1 is a block diagram of an operating environment 100 that supports a method and system for verifying legal compliance verification of consumer products on a server communicatively coupled with a communications network 106. The server 102 and devices 120, 163-164 may be communicatively coupled with a communications network 106, according to an example embodiment. The environment 100 may comprise computing devices 120, 163-164 which may communicate with server 102 via a communications network 106. Said computing devices may be mobile computing devices. Mobile computing devices may comprise a cellular/mobile telephone, smart phone, tablet computer, laptop computer, handheld computer, desktop computer, wearable computer, or the like. The mobile computing devices may be connected either wirelessly or in a wired or fiber optic form to the communications network 106. Communications network 106 may be a packet switched network, such as the Internet, or any local area network, wide area network, enterprise private network, cellular network, phone network, mobile communications network, or any combination of the above.

FIG. 1 also shows an identification device or tag 121 placed on, in, or around consumer product 111. Tag 121 may be a near field communication (NFC) tag that emits radio frequency signals that comport with the ISO/IEC 18092 and ECMA 340 communications protocol standards. Tag 121 may also include encryption and authentication standards such as those described in ISO/IEC 18000, 29167 and ISO/IEC 20248. The tag 121 may also store additional data about a consumer product, such as any of the data in the consumer product's record, described in further detail below. In general, the tag 121 may be any radio frequency device that is configured to transmit a radio frequency signal that is readable over short distances. The tag 121 may also be configured for attachment to product packaging in such a way that the tag is able to detect if the product packaging has been opened. For example, one or more conductive terminals may be disposed on the surface of the tag and the surface of the tag may be applied (such as by adhesive) to the product packaging along a rip line or other line in which the product must be opened. When the product packaging is opened, the one or more conductive terminals are no longer conductively coupled, which may be detected by the tag. The tag 121 may also include temperature and humidity data and be configured to keep a log of temperature and humidity data regarding shipment and storage of the consumer product to which it is affixed.

FIG. 1 also shows an identification device or tag 122 placed on, in, or around consumer product 111. Tag 122 may be a radio frequency identification (RFID) tag that emits radio frequency signals that comport with RFID communications protocol standards, such as ISO/IEC 14443, 1569318000, 1809218185, 21481, ASTM D7434, D7435, D7580. Tag 122 also store additional data about a consumer product, such as any of the data in the consumer product's record, described in further detail below. In general, the tag 122 may be any radio frequency device that is configured to transmit a radio frequency signal that is readable over short distances. The tag 122 may also be configured for attachment to product packaging in such a way that the tag is able to detect if the product packaging has been opened, as described above. The tag 122 may also include temperature and humidity data and be configured to keep a log of temperature and humidity data regarding shipment and storage of the consumer product to which it is affixed. In one embodiment, tag 121 and/or tag 122 is placed on, in, or around the product 111.

The environment 100 shows that device 120 is operated by a user 110, which may be a person, a retailer, a manufacturer, an importer, an exporter, a transporter, a government worker, a distributor, a border security worker, a tax worker, an end-user of the consumer product 111, an intermediate user of the consumer product, or the like. Server 102, tags 121, 122 and devices 120, 163-164 may each comprise a computing device 600, described below in greater detail with respect to FIG. 6.

In another embodiment, the devices 120, 121, 122 may also calculate current geographical position (otherwise referred to as geographical location data) using a subsystem, an on-board processor, or a connected processor. In one embodiment, the devices may calculate current position using a satellite or ground-based positioning system, such as a Global Positioning System (GPS) system, which is a navigation device that receives satellite or land-based signals for the purpose of determining the device's current geographical position on Earth. Generally, devices 120, 123 calculates global navigation satellite system (GNSS) data. A GNSS or GPS receiver, and its accompanying processor, may calculate latitude, longitude, and altitude information. In this document, the terms GNSS and GPS are used generally to refer to any global navigation satellite system, such as GLONASS, GALILEO, GPS, etc. In this embodiment, a radio frequency signal is received from a satellite or ground-based transmitter comprising the time the signal was transmitted and a position of the transmitter. Subsequently, the devices calculate current geographical location data of the device based on the signal. In another embodiment, the devices calculate current geographical location using alternative services, such as control plan locating, GSM localization, dead reckoning, or any combination of the aforementioned position services. The term spatial technologies or spatial processes refers generally to any processes and systems for determining one's position using radio signals received from various sources, including satellite sources, land-based sources, and the like.

Computing device 102 includes a software engine that delivers applications, data, program code and other information to networked devices, such as device 120. The software engine of device 102 may perform other processes such as transferring multimedia data in a stream of packets that are interpreted and rendered by a software application as the packets arrive. FIG. 1 further shows that device 102 includes a database or repository 104, which may be a relational database comprising a Structured Query Language (SQL) database stored in a SQL server. Mobile computing device 120 may also include its own database, either locally or via the cloud. The database 104 may serve related information from a product's corresponding product record (located in database 104), which may be used by device 102 and 163-164.

Device 102, mobile computing devices 120, 163-164 and tags 121, 122 may each include program logic comprising computer source code, scripting language code or interpreted language code that perform various functions of the disclosed embodiments. In one embodiment, the aforementioned program logic may comprise program module 606 in FIG. 6. It should be noted that although FIG. 1 shows only one mobile computing device 120, one tag 121/122 and one server 102, the system of the disclosed embodiments supports any number of servers, tags and mobile computing devices connected via network 106. Also note that although server 102 is shown as a single and independent entity, in one embodiment, server 102 and its functionality can be realized in a centralized fashion in one computer system or in a distributed fashion wherein different elements are spread across several interconnected computer systems.

The database 104 may include a consumer product record for each individual consumer product 111. A consumer product record may include: the consumer product name, a consumer product identifier (which may be unique), information about the authenticity of the consumer product, consumer product packaging information, exclusive commercial content relating to the consumer product, pairings relating to the consumer product, instructions for use related to the consumer product, warranty information, rewards or benefits related to the consumer product, interactive content, augmented reality media, information regarding upcoming events related to the brand of the consumer product, information regarding integration with social networks, redirect links to the vendor or manufacturer's website, nearby events relating to the consumer product, etc. A consumer product record may further include a unique code, such as a UPC code or a QR code, corresponding to the consumer product. A consumer product record may further include information about how and whether a product has passed regulatory entity registration or has been deemed compliant with regulatory entity registration.

A consumer product record may also include a unique identifier for a product. A unique identifier is an identifier that is registered to a specific unit of the consumer product. Unique identifiers avoid shortcomings that are associated with the use of product identifiers alone, giving each unit of the consumer product its own identifier to facilitate in the recognition and verification of authenticity of the consumer product. A consumer product record may also include a hash algorithm, which is an algorithm or hash function that maps data of arbitrary size to fixed-size values. The value returned by a hash algorithm is a hash or hash value. A tag may produce a unique hash that is distinctive and exclusive for the particular interaction. This hash is included as a query string parameter in a URL including a unique identified and counter mirroring (explained in greater detail below). A consumer product record may also include a data value indicating whether said consumer product is regulated by a governmental authority and/or has passed or is otherwise compliant with regulatory review by a governmental authority.

A consumer product record may also include descriptive information about the consumer product, verification of legal compliance of the consumer product and a consumer product import tax calculation. Said verification may include one or more documents indicating proof of legal compliance such as documents indicating proof of payment of one or more governmental taxes or fees, documents indicating proof of compliance with one or more governmental safety laws, regulations or standards, documents indicating proof of compliance with one or more importation laws, regulations or standards, documents indicating proof of compliance with one or more manufacturer records, documents indicating traceability of said consumer product, wherein said one or more documents are stored in a blockchain accessible via the communications network, documents indicating said consumer product is a declared product with one or more governmental entities, documents indicating approval of said consumer product by the Food and Drug Administration (FDA) or a corresponding health department.

FIG. 1 also shows a plurality of third parties 163-164 coupled with network 106. The plurality of third parties 163-164 may comprise one or more entities, such as one or more governmental entities, regulatory entities, users, people, retailers, manufacturers, importers, exporters, transporters, government workers, distributors, border security entities, tax entities, end-users, intermediate users, or the like.

A regulatory entity may comprise one or more entities, such as one or more governmental entities, which includes a database from which it may be determined if a consumer product has been listed, registered, approved, deemed compliant, reviewed or otherwise processed in any way for the purpose of promoting public health. Said database may be checked to determine whether or not a consumer product has been listed, deemed compliant, registered or approved. Said regulatory entity may confirm that a consumer product has been listed, registered, approved, deemed compliant, reviewed or otherwise processed in any way for the purpose of promoting public health by a regulatory entity or authority.

Figure 2:
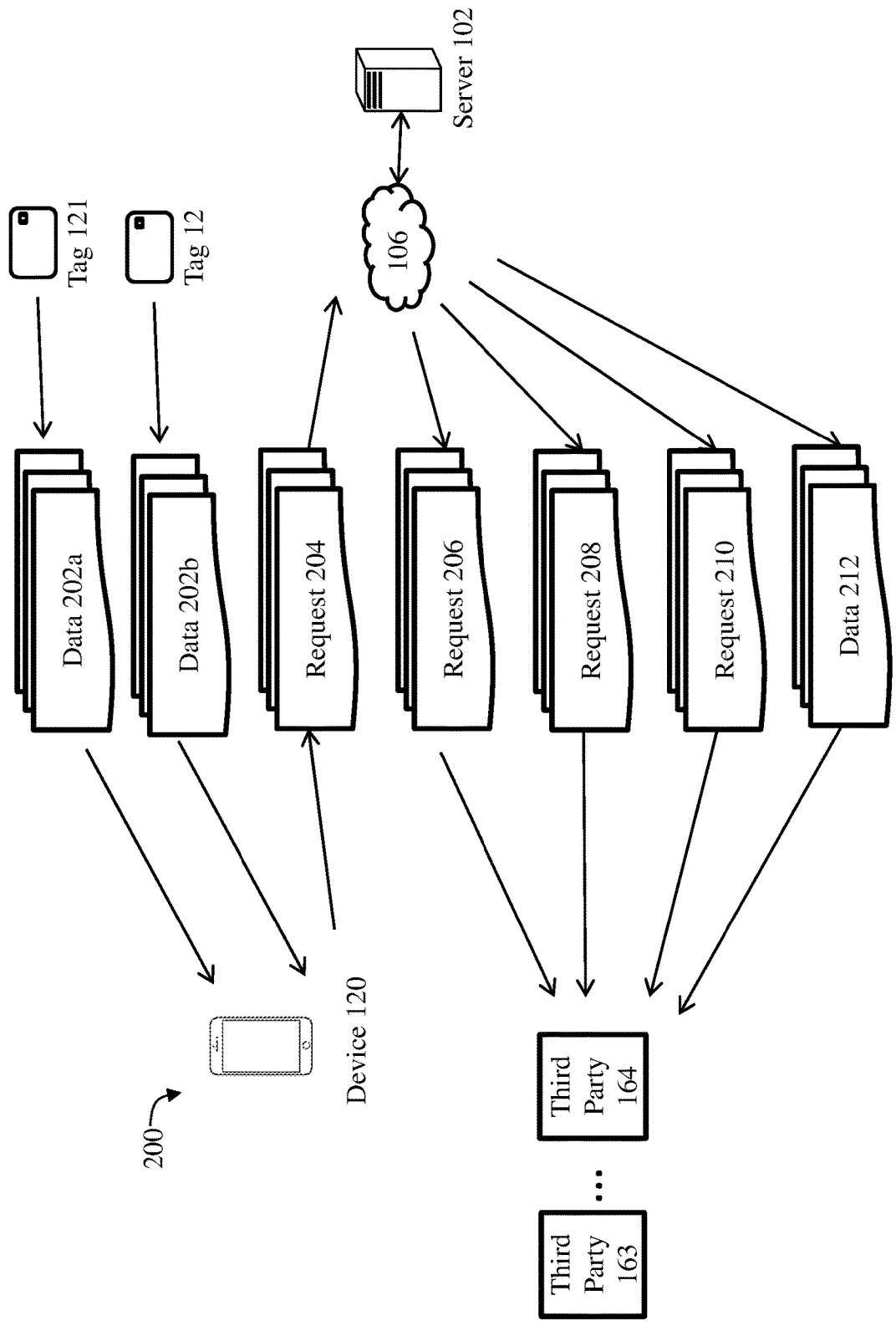
FIG. 2 is a diagram showing the data flow of the process for facilitating legal compliance verification of consumer products, according to an example embodiment.
Figure 4:
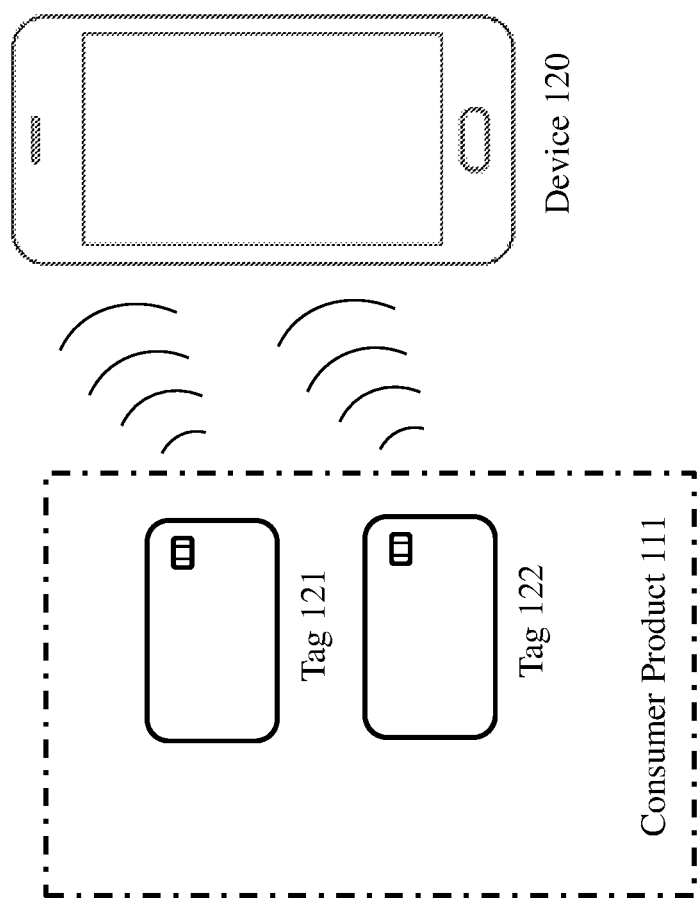
FIG. 4 is a drawing depicting the process of transmitting data from tags on a consumer product to a consumer mobile device, according to an example embodiment.
Figure 5:
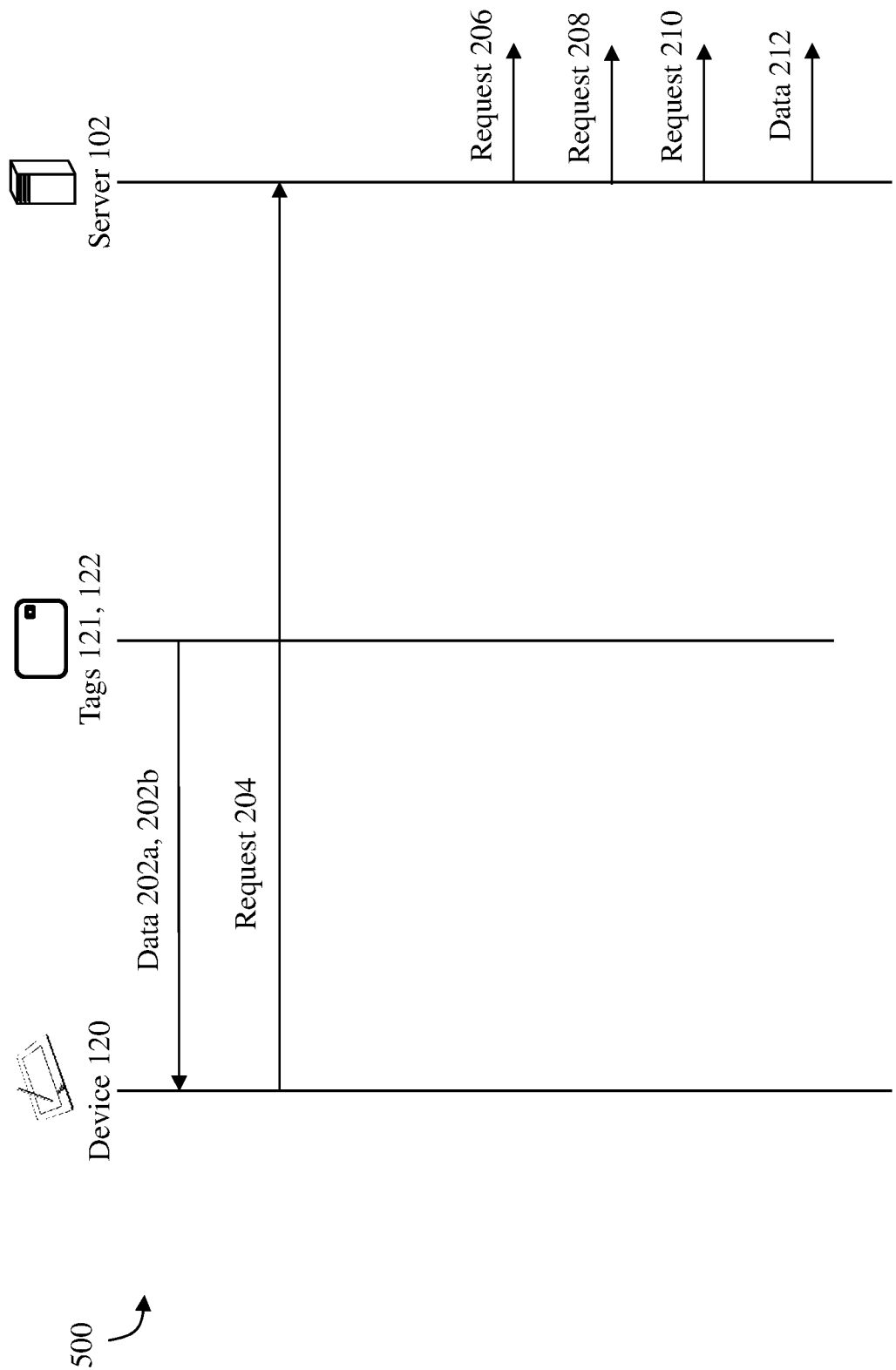
FIG. 5 is a diagram showing the interaction between nodes during the process of legal compliance verification of consumer products, according to an example embodiment.

The method and system for verifying the legal compliance of a consumer product is described in more detail below, with reference to FIGS. 2-5. FIG. 2 is a diagram showing the data flow 200 of the process for facilitating verifying the legal compliance of consumer products, FIG. 3 is a flow chart 300 of a method for the same, and FIG. 5 is a diagram 500 showing the interaction between the nodes in the process of legal compliance.

Figure 3:
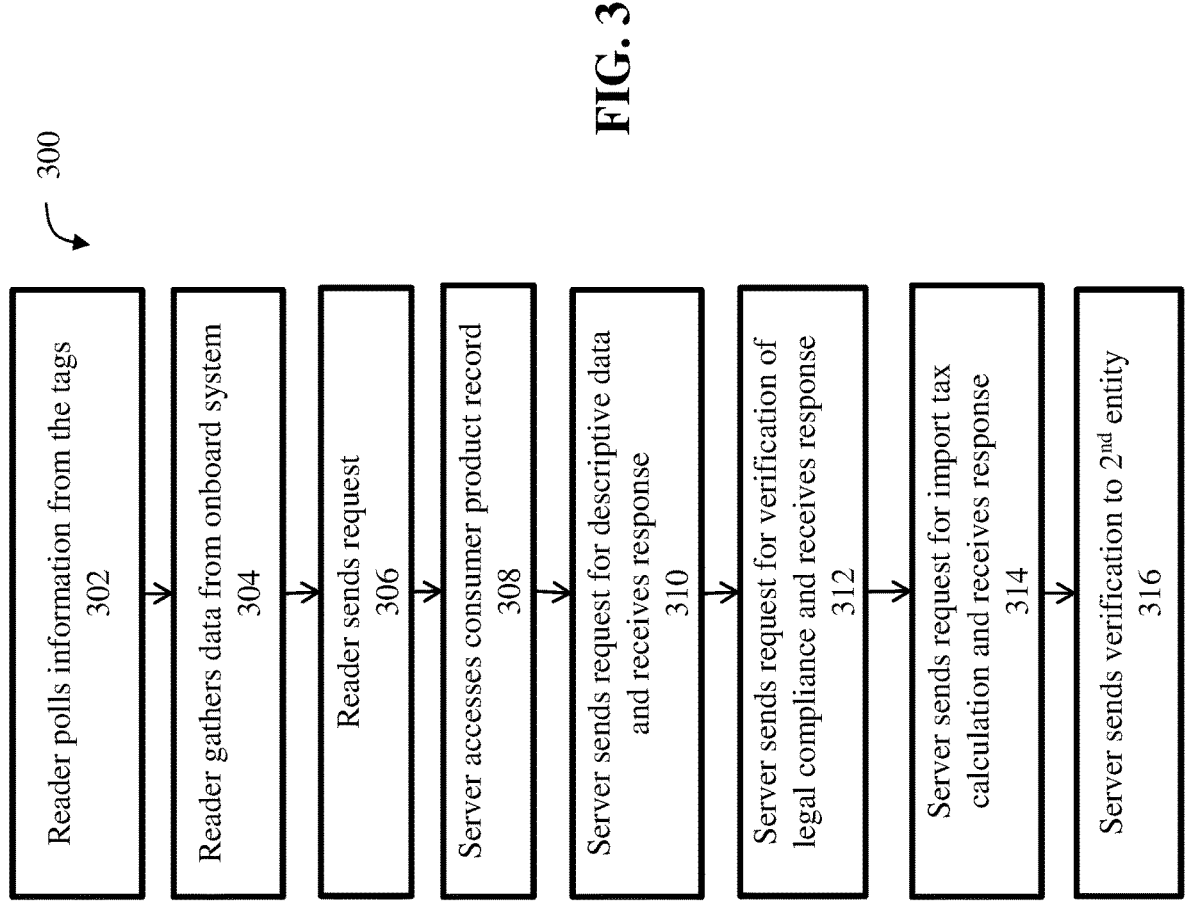
FIG. 3 is a flow chart of a method for legal compliance verification of consumer products, according to an example embodiment.

The process of verifying legal compliance status of a consumer product 111 begins with step 302 of FIG. 3. In step 302, the reader on device 120 polls information 202a from the tag 121 and information 202b from tag 122. For reference, and only as an example, FIG. 4 shows the tags placed in close proximity to the mobile device 120 (also be referred to herein as "reader") to initiate the process of FIG. 3. This process is initiated by the user 110 (or any other party) by either tapping or scanning the tags, depending on which type of tags have been placed on the consumer product 111 or its packaging.

In step 302, in one option, some or all of the data 202a, 202b read by device 120 is displayed on device 120. Data 202a and data 202b may each include, for example, the consumer product name, a product identifier, a unique identifier, a product description, warranty information, and/or a photo of the product. In another embodiment, data 202a and data 202b may each include a hash that is produced by the tag wherein encoded in said hash is the unique identifier that identifies the tag itself. The hash may be referred to as an encrypted packet that includes the unique identifier that identifies the tag itself. The data 202a and data 202b may each include a counter, which is a numerical value that represents how many times the tag has been scanned to provide data, and which is increased sequentially each time the tag is tapped. The data 202a and data 202b may each optionally include a URL that includes both the unique identifier that identifies the tag itself and the counter as parameters in the URL. The data 202a and data 202b may each include a value that indicates whether the product packaging has been opened yet. The data 202a and data 202b may each include any data that the tag is capable of storing. The data 202a and data 202b may each include a URL containing an encrypted packet comprising a hash that uniquely identifies said tag. The data 202a may be referred to as first identifying data, and the data 202b may be referred to as second identifying data. Alternatively, the data 202a and data 202b may each include the encrypted packet comprising a hash that uniquely identifies said tag.

In one embodiment, in step 302, the application on the computing device is further configured for reading data from the radio frequency tag if said radio frequency tag provides an encrypted data packet to said application, wherein said application contains a key for unencrypting said data packet.

In step 304, the reader on the device 120 gathers data 202a, 202b from the onboard system, and in step 306 the reader sends a request 204 (such as an HTTP request) via the network 106 to the server 102. The data sent in request 204 may include the product identifier and unique identifier which the server may use to process the request, authenticate the consumer product, and return the relevant information. The data sent to the server may also include the hash described above, the unique identifier that identifies the tag itself and a counter.

Next, in step 308, the server processes and logs the data from the request 204 sent in step 306. The product identifier and unique identifier sent in the request are used in this step by the server to identify and access the correct product record in database 104 and compare the data 204 to the data in the correct product record.

In step 310, the server 102 transmits, via the communications network 106, a request 206 for descriptive information about the consumer product 111 to one or more of the third parties 163-164, such as an importer, a governmental entity, or an application user, and receives said descriptive information, via the communications network 106.

In step 312, the server 102 transmits, via the communications network 106, a request 208 for verification of legal compliance of the consumer product 111 to one or more of the third parties 163-164, and receives said verification of legal compliance, via the communications network 106.

In step 314, the server 102 transmits, via the communications network 106, a request 210 for consumer product import tax calculation, other tax or governmental fee, of the consumer product 111 to one or more of the third parties 163-164, and receives said consumer product import tax calculation, other tax or governmental fee, via the communications network 106.

In step 316, the server 102 transmits, via the communications network 106, a verification of legal compliance of the consumer product 111 (i.e., data 212) to one or more of the third parties 163-164, via the communications network 106.

It should be noted that before the consumer product 111 is purchased, the tags 121, 122 of the product may be scanned or read and the particular product 111 (as uniquely identified by the unique identifier) may be tracked and traced (and logged in database 104) during the process of manufacturing, importing, storing, distributing, and transporting said product to its final retail location before purchase. Specifically, said information may be logged in the product record corresponding to the unique identifier.

It should be noted that when the consumer product 111 is purchased, the tags 121, 122 of the product may be scanned or read and the purchase of the particular product 111 (as uniquely identified by the unique identifier) may be logged in database 104 at the point of sale. Specifically, said information may be logged in the product record corresponding to the unique identifier. Specifically, said information may be logged in the product record corresponding to the unique identifier.

Additional functionality of server 102 may include one or processes configured for allowing a user digital and real-time control of said consumer product and one or processes configured for providing automated and real-time industry and governmental legal audits of said consumer product, including storing in a blockchain accessible via the communications network of legal data pertaining to said consumer product.

Figure 6:
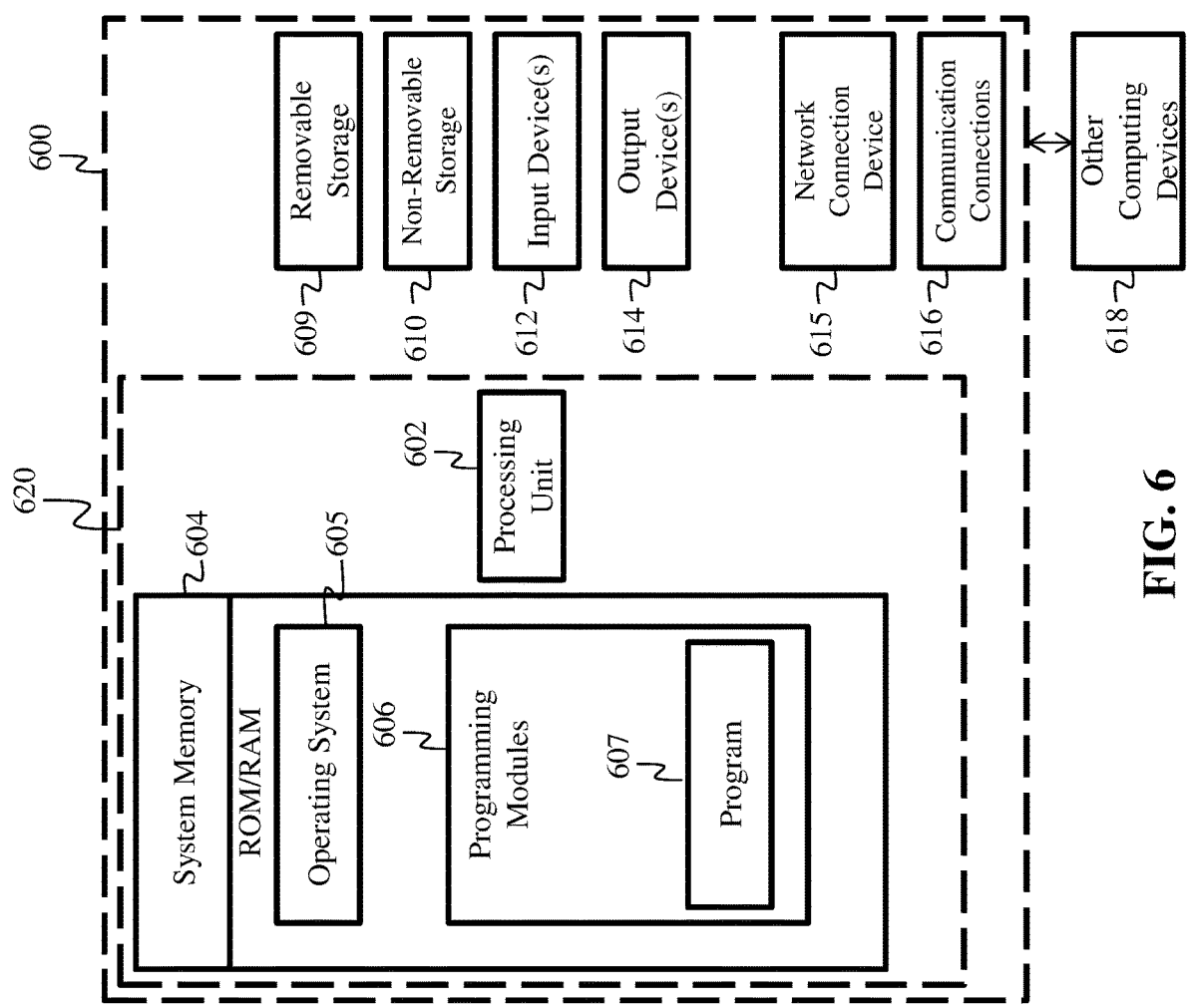
FIG. 6 is a block diagram of a system including a computing device, according to an example embodiment.

FIG. 6 is a block diagram of a system including an example computing device 600 and other computing devices. Consistent with the embodiments described herein, the aforementioned actions performed by device 102, 120, 121, 122, 163-164 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for system 100 and process 300, as described above. Process 300 may operate in other environments and are not limited to computing device 600.

With reference to FIG. 6, a system consistent with an embodiment may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g., random-access memory (RAM)), non-volatile (e.g., read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of devices 102, 120, 121, 122, 163-164. Furthermore, embodiments may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. Computing device 600 may also include a vibration device capable of initiating a vibration in the device on command, such as a mechanical vibrator or a vibrating alert motor. The aforementioned devices are only examples, and other devices may be added or substituted.

Computing device 600 may also contain a network connection device 615 that may allow device 600 to communicate with other computing devices 618, such as over a network in a distributed computing environment, for example, an intranet or the Internet. Device 615 may be a wired or wireless network interface controller, a network interface card, a network interface device, a network adapter, or a LAN adapter. Device 615 allows for a communication connection 616 for communicating with other computing devices 618. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g., program module 607) may perform processes including, for example, one or more of the stages of the process 300 as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including hand-held devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for legal compliance of a consumer product, the method comprising:
    coupling a radio frequency (RF) tag to the consumer product wherein said RF tag is programmed to provide a unique product identifier to a mobile computing device when said RF tag is scanned;
    storing in a database, communicatively coupled to a communications network, a record for each of a plurality of consumer products, wherein each record includes at least a unique product identifier;
    executing an application on a computing device communicatively coupled to the communications network, wherein said application is configured for reading the unique product identifier from the RF tag, and transmitting the unique product identifier to a server via the communications network;
    wherein the server is configured for:
    i) receiving the unique product identifier, via the communications network, from the application;
    ii) accessing a record in the database that corresponds to the unique product identifier;
    iii) transmitting, via the communications network, a request for descriptive information about the consumer product to an importer, a governmental entity, or an application user, and receiving said descriptive information, via the communications network;
    iv) transmitting a request for verification of legal compliance of the consumer product, via the communications network, to a governmental entity and receiving said verification, via the communications network;
    v) transmitting, via the communications network, a request for a consumer product import tax calculation, other tax or governmental fee, and receiving said consumer product import tax calculation, via the communications network;
    vi) transmitting the verification of legal compliance of the consumer product, via the communications network, to a second importer, governmental entity, or application user.

2. The method of claim 1, further comprising storing said descriptive information about the consumer product, and said verification of legal compliance, in the record that corresponds to the unique product identifier.

3. The method of claim 2, wherein said verification includes one or more documents indicating proof of legal compliance.

4. The method of claim 3, wherein said one or more documents indicating proof of legal compliance further comprise one or more documents indicating proof of payment of one or more governmental taxes or fees.

5. The method of claim 4, wherein the one or more documents indicating proof of legal compliance further comprise one or more documents indicating proof of compliance with one or more governmental safety laws, regulations or standards.

6. The method of claim 5, wherein the one or more documents indicating proof of legal compliance further comprise one or more documents indicating proof of compliance with one or more importation laws, regulations or standards.

7. The method of claim 6, wherein the one or more documents indicating proof of legal compliance further comprise one or more documents indicating proof of compliance with one or more manufacturer records.

8. The method of claim 7, wherein the one or more documents indicating proof of legal compliance comprises one or more documents indicating traceability of said consumer product, wherein said one or more documents are stored in a blockchain accessible via the communications network.

9. The method of claim 8, wherein the one or more documents indicating proof of legal compliance comprises one or more documents indicating said consumer product is a declared product with one or more governmental entities.

10. The method of claim 9, wherein the one or more documents indicating proof of legal compliance comprises one or more documents indicating approval of said consumer product by the Food and Drug Administration (FDA) or a corresponding health department, and further comprising transmitting, over the communications network, the one or more documents indicating approval of said consumer product by the FDA or a corresponding health department.

11. The method of claim 10, further comprising:
    coupling a near field communication (NFC) tag to said consumer product, wherein said NFC tag is programmed to provide the unique product identifier to a mobile computing device when said NFC tag is scanned; and
    executing a second application on the computing device communicatively coupled to the communications network, wherein said second application is configured for reading the unique product identifier from the NFC tag and transmitting the unique product identifier to the server via the communications network.

12. The method of claim 11, further comprising one or processes configured for allowing a user digital and real-time control of said consumer product.

13. The method of claim 12, further comprising one or processes configured for providing automated and real-time industry and governmental legal audits of said consumer product, including storing in a blockchain accessible via the communications network of legal data pertaining to said consumer product.

* * * * *